(No Model.)
O. B. SHALLENBERGER.
APPARATUS FOR CONNECTING ALTERNATE CURRENT ELECTRIC GENERATORS.
No. 372,935. Patented Nov. 8, 1887.
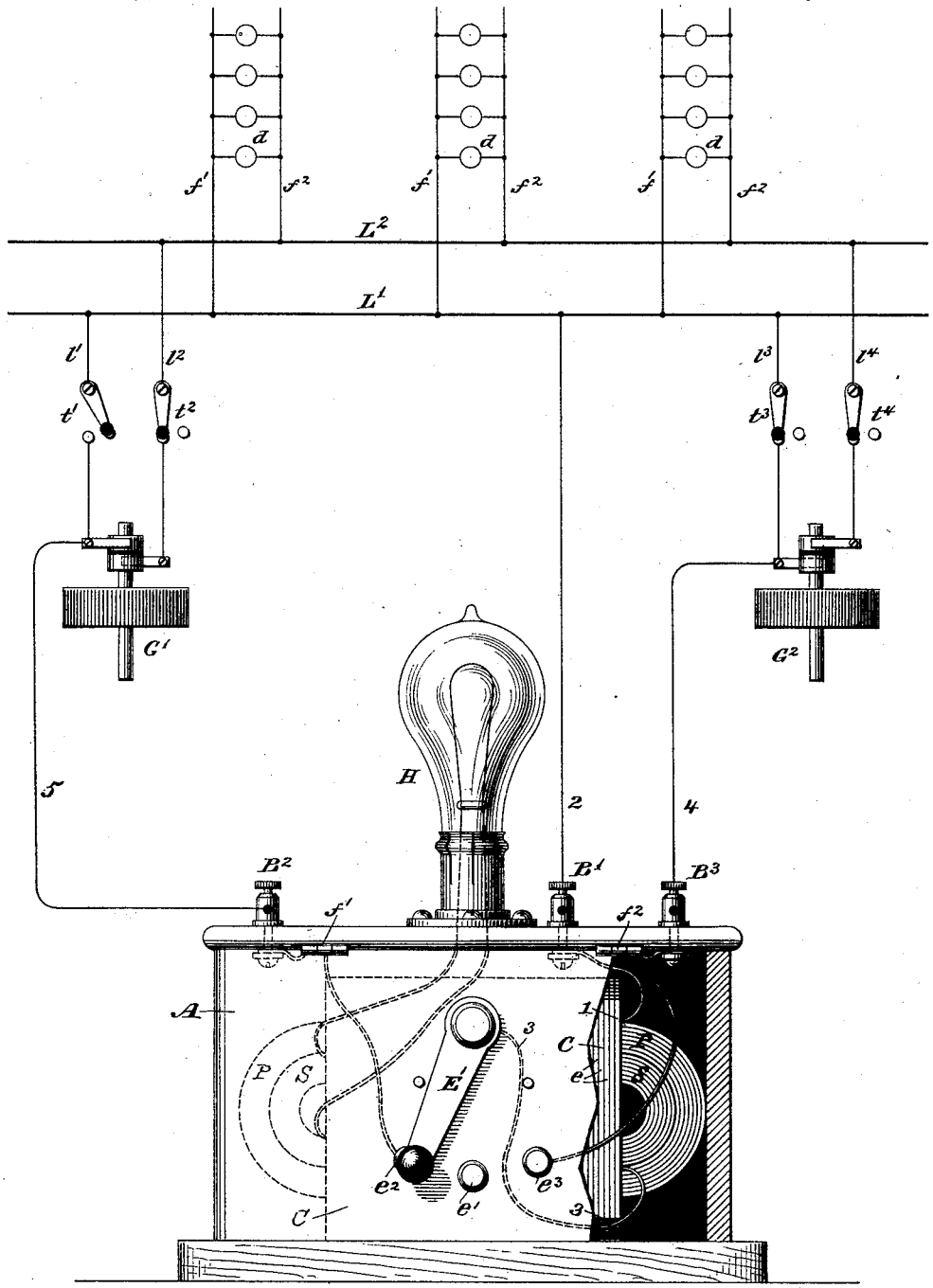
Witnesses
Geo. W. Breck
Carrie E. Ashley
By his Attorneys
Inventor
O. B. Shallenberger
Pope & Edgecomb

UNITED STATES PATENT OFFICE.

OLIVER B. SHALLENBERGER, OF ROCHESTER, ASSIGNOR TO GEORGE WESTINGHOUSE, JR., OF PITTSBURG, PENNSYLVANIA.

APPARATUS FOR CONNECTING ALTERNATE-CURRENT ELECTRIC GENERATORS.

SPECIFICATION forming part of Letters Patent No. 372,935, dated November 8, 1887.

Application filed January 17, 1887. Serial No. 224,523. (No model.)

*To all whom it may concern:*

Be it known that I, OLIVER B. SHALLENBERGER, a citizen of the United States, residing in Rochester, Beaver county, in the State of Pennsylvania, have invented certain new and useful Improvements in Apparatus for Connecting Alternate-Current Electric Generators, of which the following is a specification.

The invention relates to a system of apparatus and circuits for connecting alternate-current electric generators in multiple-arc circuit.

The object of the invention is to provide a convenient device whereby the relative phases of two different generators delivering alternate currents may be readily determined, so that the two may be conveniently and safely connected in multiple-arc or parallel circuit.

In another application filed by me December 7, 1886, Serial No. 220,909, there is described a system of circuits whereby the phases of the currents delivered by alternate-current generators may be determined in essentially the same manner as that shown herein; and this invention comprises apparatus adapted to be employed in connection therewith, and contemplates certain modifications therein.

In the accompanying drawing there is shown a front view of a device adapted to be employed in carrying out this invention, and in diagram the circuit-connections.

Referring to the figure, A represents a suitable inclosing case or box for containing an electric converter or induction-coil, C. This induction-coil or converter may be constructed in any well known form. Preferably, however, it consists of thin plates of metal, $e$, inclosing a primary coil, P, and a secondary coil, S, organized much in the manner described in an application for Letters Patent filed by Albert Schmid December 27, 1886, Serial No. 222,535. One terminal of the primary coil P is connected permanently by a conductor, 1, with a binding-post, B', at the top of the box A, and this binding-post is connected by a conductor, 2, with one of the conductors, L', of a distributing-circuit, L' L². The remaining terminal of the primary coil is connected by conductor 3 with a switch-arm, E', placed upon the door of the box. This arm is provided with two contact-points, $e^2$ $e^3$, and a resting-point, $e'$. The point $e^2$ is connected through the hinge $f'$ of the lid with a binding-post, B², and the point $e^3$ is connected through the hinge $f^2$ with the binding-post B³. When, therefore, the switch-arm E' is upon the point $e^2$, the connections of the primary coil will be continued to the binding-post B².

It is designed that the circuit shall be completed from the binding-post B² or B³ through a conductor, 5 or 4, leading from one pole of an electric generator, G' or G², accordingly as it is designed that the generator G' or G² shall be connected in circuit with the one already in operation. If, therefore, the generator G² is delivering a current upon the lines L' L², and it is desired to couple the generator G' in multiple arc, it is necessary that the two should be made to coincide and deliver the same current at the moment the connections are completed. To this end the connections of the respective dynamos with the lines L' L² are through conductors $l'$, $l^2$, $l^3$, and $l^4$, which include circuit-interrupting switches $t'$ $t^2$ $t^3$ $t^4$, respectively. The switches $t^3$ and $t^4$ being closed, the switch $t^2$ may also be closed and the switch-arm E' placed against the point $e^2$. This will complete the circuit of the primary coil of the converter. It is desired, however, that the circuit of the secondary coil be completed through some indicating device which shall determine whether or not the currents of the two generators combine to flow in the same direction, or whether they unite to supply the feeders $f'$ $f^2$ $f'$ $f^2$, which include the translating devices $d$ $d$ in multiple-arc circuit. For this purpose the respective terminals of the secondary coil S are connected with the terminals of a suitable incandescent electric light, H, placed in a socket upon the top of the box. When the currents unite to flow in the same direction, this lamp will burn at its highest brilliancy. When, however, they oppose, it will burn at its lowest brilliancy, or will give out no light. This indicates the exact moment at which the devices may be connected without injury to the circuits. The switch $t'$ may therefore be closed at such a moment, placing the generator G' in full circuit. Having once connected the generators, they will maintain themselves in unison on account of the dynamic effects which one generator exercises over the other. In case the generator G' is already in circuit and the generator $G^2$ is to be connected, the switch-arm E' is moved to the point $e^3$. In either case the full connections are to be made by means of the switches $t'$ $t^3$, substituting thereby the connection directly with the lines $L'L^2$, and the corresponding connection through the line 5 and 4 may then be interrupted by moving the arm E' to the point $e'$.

I claim as my invention—

1. The combination, with a system of electrical distribution, of two alternate-current electric generators, one connected in a circuit with said system, an electrical converter having one terminal of its primary coils connected in circuit with said distributing system, a switch for placing the other terminal in connection with the second generator, circuit-connections from the remaining terminal of the second generator, whereby it may be placed in parallel circuit with the first, and an incandescent electric lamp or other indicating device included in the circuit of the secondary coil of said converter.

2. The combination, with a work-circuit and two alternate-current electric generators, of an apparatus for connecting the same in parallel circuit, consisting of an electric converter, circuit-controlling devices for connecting one terminal of its primary coil with either generator at will, a connection from the other terminal with one pole of the other generator, circuit-connections between the remaining poles of the two generators, and an indicating device included in the circuit of the secondary coil of the converter, substantially as described.

3. The combination of two alternate-current electric generators, an electric converter, circuit-controlling devices for placing one terminal of the primary coil of the same in connection with either generator, a switch for placing the other terminal of the primary coil in connection with the corresponding pole of the other generator, an electric circuit with which the circuit of the first-named generator is complete, means for completing the connections of the other generator with said circuit in multiple arc with the first-named generator, and an indicating device included in circuit with the secondary coil of said converter.

4. The combination, substantially as hereinbefore set forth, of an inductive electric resistance, two alternate-current electric generators, switches for placing said generators in multiple-arc connection through said resistance, an indicating device operated through the instrumentality of the current traversing such resistance, and means for placing the generators in multiple-arc connection independently of said resistance.

5. The combination, with two alternate-current electric generators, of a main circuit, means for connecting either generator with said circuit at will in full circuit, an indicating device consisting of a converter adapted to have its primary coil connected in circuit with either generator at will, and an incandescent electric lamp included in the secondary circuit of the converter.

6. An indicating device for connecting generators, consisting of the combination of the inclosing-case, the converter included therein, the binding-posts carried by the box, contact-points upon the lid of the box, a contact-arm applied thereto and connected to one of the binding-posts through the primary coil, connections between two other binding-posts and said contact-points, respectively, and an incandescent electric lamp mounted upon the box and included in the secondary circuit of the coil.

In testimony whereof I have hereunto subscribed my name this 7th day of December, A. D. 1886.

OLIVER B. SHALLENBERGER.

Witnesses:
WALTER D. UPTEGRAFF,
CHARLES A. TERRY.